Dec. 20, 1955   J. ADAMS, JR   2,727,844
CONVEYOR BELT
Filed Jan. 11, 1954
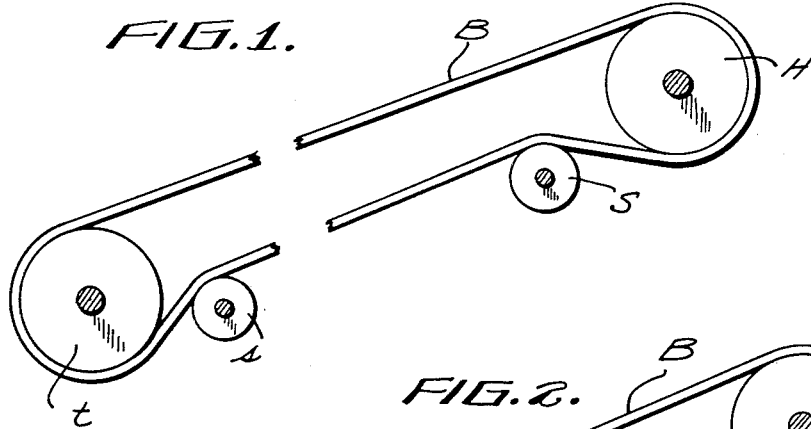
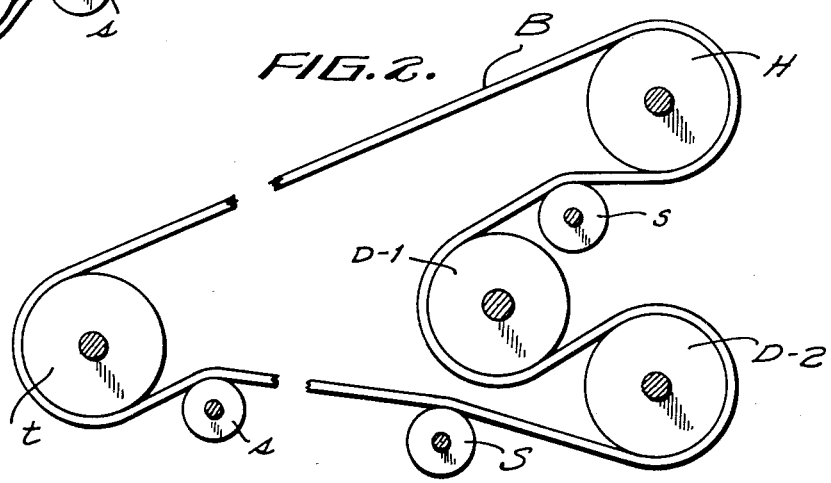
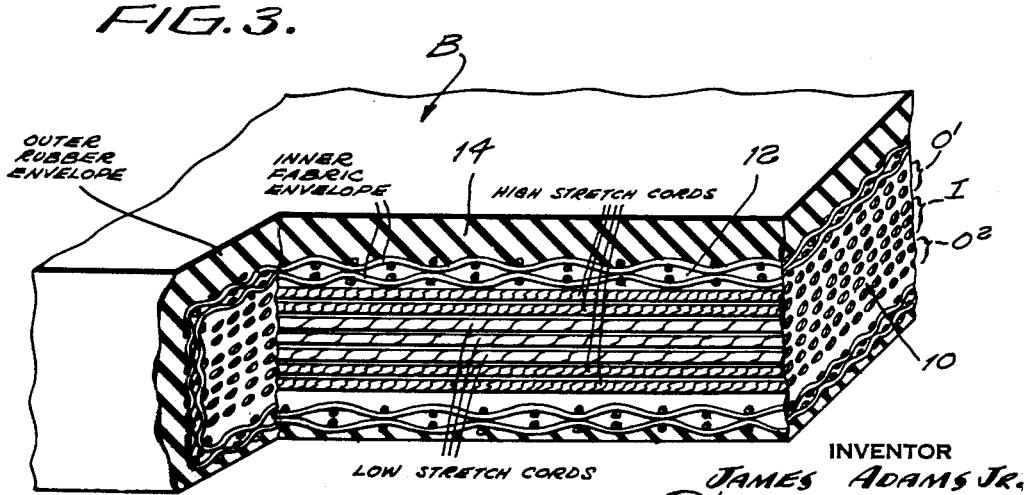
INVENTOR
JAMES ADAMS JR.
BY
James K. Franklin
ATTORNEYS

United States Patent Office 2,727,844
Patented Dec. 20, 1955

2,727,844

CONVEYOR BELT

James Adams, Jr., Packanack Lake, N. J., assignor to Raybestos-Manhattan, Inc., Passaic, N. J., a corporation of New Jersey Application January 11, 1954, Serial No. 403,419

10 Claims. (Cl. 154—52.2)

This invention relates to a laminated belt, and more particularly, to a conveyor belt.

Conveyor belts are usually made up of a number of plies of the same type of fabric or belt strength members, bound together and rubber covered. Such conveyor belts are customarily driven either by a single head pulley drive system, with a snub pulley to increase the arc of contact over the head drive pulley, or with a dual or tandem drive system, which latter is a combination of a head pulley, two drive pulleys and a snub pulley. In both systems the rear end of the conveyor belt is trained over a tail pulley.

With a single head drive the maximum belt tension is at the head pulley, a somewhat lower tension is at the snub pulley (and the lowest tension is at the tail pulley). The bottom or inside of the belt is in contact with the head pulley, and the top or outside of the belt is in contact with the snub pulley, thus giving a relatively high tension reversal to the belt at the drive elements. With the dual or tandem drive the highest belt tension is at the head pulley, substantially the same tension is at the first drive pulley, a lower tension is at the second drive pulley and a lower tension is at the snub pulley. With the tandem drive the bottom or inside of the belt is in contact with the head pulley, the top or outside of the belt is in contact with the first drive pulley, the bottom of the belt is in contact with the second drive pulley, and the top of the belt is again in contact with the snub pulley, thus giving two high tension reversals and one lower tension reversal to the belt at the drive elements. When the belt is flexed over any of the pulleys the outside ply is extended most and normally carries a greater share of the load than any of the other plies, the tension being progressively decreased in the plies going from the top to the bottom of the belt. Often the very bottom plies of the belt carry no load; in fact, may be in compression as the belt is being flexed. Also, the smaller the pulley diameter the greater the tension differential between the top and bottom plies.

It is known that if belt strength members of the same stretch characteristics are used in all of the plies of a belt, then the differential of stress or tension as between the top and bottom plies of a belt on the belt flexing will be quite large. This gives rise to correspondingly large changes between high tension and low tension in the outside plies of the belt, during belt reversals or even in a flexing cycle, and this, in turn, results in increased flexing fatigue and reduction in fatigue life of these belt plies with resultant rapid deterioration of the belt structure as a whole.

It is a well established engineering principle that flexing fatigue is accelerated by the following factors:

1. The higher the tension in flexing the greater the rate of fatigue;
2. Any change from high tension to low tension incident pronouncedly, for example, to belt reversal flexing, greatly reduces the fatigue life; and
3. If during flexing or belt reversals the fabrics or cords of the belt strength members or plies are actually put into compression, the fatigue rate is very much increased.

The prime object of the present invention accordingly centers about the construction of a laminated belt such as a conveyor belt embodying the following principles of construction for accomplishing the hereinbelow indicated functional behavior:

(a) The belt strength members (the superimposed fabric plies) constituting the body of the laminated belt, are so designed and organized that the tension differential as between the top and bottom plies is materially reduced and thereby the changes between high tension and low tension in these plies are very materially reduced, that is, the alternating extremes of tensions during flexing or belt reversals for the plies that normally suffer from such alternating extremes are greatly reduced in amount.

(b) The belt strength members or plies are designed and arranged so that the outer plies (both at the top and bottom of the belt body) are capable of both a stretch and a compression greater than the inside plies (i. e., the plies between the outer plies) of the body.

Constructionally, the belt body of the invention is made to comprise a series of superimposed plies of fabric belt strength members, the plies of said belt strength members being arranged in three zones, namely, an inside zone and two outer zones, the fabric belt strength members of the inside zone comprising cords characterized by the property of relatively low stretchability, and the fabric belt strength members of each of the two outer zones comprising cords characterized by the property of relatively high stretchability and also of compressibility.

With a structure of this nature it is found that the following functional behavior and advantages are achieved:

1. When a belt with such a strength member construction is flexed (directly or reversely) under tension over a pulley, the outside plies, namely, the plies of each of the two outer zones, due to their relatively high stretch characteristic, will carry less tension than would otherwise be carried by these plies. These plies, therefore, function as relatively low tension plies.

2. The plies of the belt strength members of the inside zone, due to their relatively low stretch characteristic, will carry the greater portion of the total tension of the belt. These plies, therefore, function as the relatively high tension plies. Also, because of their relatively low stretch, they serve to limit the extensibility of the belt so that there will be no excessive stretch of the belt in operation. (It is highly desirable to keep the elongation of the belt to a minimum between its two extremes of operating tensions, namely, the minimum tension with the belt operating at full speed, no load, and the maximum when starting the belt fully loaded.)

3. When the belt is flexed in a flexing cycle or a reversal, it follows from (1) and (2) that the alternating extremes of tensions for the plies of the outer zones are greatly reduced, thus materially reducing their fatigue rate as compared with the corresponding plies of a belt constructed only of strength members or plies all having the same stretch or elongation characteristic, and 4. The plies of the outer zones, being preferably also designed to have compressibility, take up the stress when they are put under compression when the belt is brought in contact with the engaging pulley, with the result that the usual increase in fatigue rate (due to a compression stress) is obviated or prevented.

To the accomplishment of the foregoing and such other objects as may hereinafter appear, the present invention relates to the laminated belt as sought to be defined in the appended claims taken together with the following specification and the accompanying drawings in which:

Fig. 1 and Fig. 2 are views exemplifying a single head drive system and the dual or tandem drive system, respectively, and Fig. 3 is a view of the belt construction of the present invention, parts being shown in transverse cross-section and other parts in longitudinal cross-section.

Referring now more in detail to the drawings, and having reference first to Figs. 1 and 2 thereof, there is shown in Fig. 1 a single head drive for a conveyor belt B, such drive system utilizing a single head pulley H and a snub pulley S, the latter arranged so as to increase the arc of contact over the head drive pulley H. The rear end of the conveyor belt is trained over a tail pulley $t$ and a snub pulley $s$. In the dual or tandem drive system shown in Fig. 2 the drive elements comprise the head pulley H, a first drive pulley D-1, a second drive pulley D-2 and snub pulleys S, S, the rear end of the conveyor belt being similarly trained over a tail pulley $t$, and a snub pulley $s$.

These systems illustrated in Figs. 1 and 2 operate upon the belt B and produce the change of tensions in the belt in the manner heretofore described, the effects being that in the head pulley drive system a relatively high tension reversal is given to the belt at the drive elements of the system shown in Fig. 1 and in the system shown in Fig. 2 two high tension reversals, one at the head pulley H and the other at the drive pulley D-1, and one low tension reversal are imparted to the belt at the drive elements.

The belt B of the present invention, illustrated in Fig. 3 of the drawings, comprises in its entirety, a belt body generally designated as 10 composed of a series of superimposed plies of fabric belt strength members bound together, this body being enveloped by a protective fabric 12 and the same enveloped, in turn, by an outer vulcanized rubber cover 14.

The belt body 10 according to the principles of the present invention is made to comprise a series of superimposed plies of fabric belt strength members arranged in three zones, namely, an inside zone I and two outer zones $O^1$ and $O^2$, respectively, the fabric belt strength members of the inside zone comprising cords characterized by the property of relatively low stretchability and the fabric belt strength members of each of the two outer zones $O^1$ and $O^2$ comprising cords characterized by the property of relatively high stretchability and preferably also of some compressibility.

To carry out the principles of the invention we have found that the use of rayon cords for the fabric of the layers or plies of the inner zone I and the use of nylon cords for the fabric of the layers or plies of the outer zones $O^1$ and $O^2$ effectively serves to secure the different stretch characteristics desired. Nylon cords or fabrics possess a higher elongation than similar cords or fabrics made of rayon. Accordingly, the plies of the inner zone I, of which there may be three layers as indicated in the drawings, are composed of rayon cords and the plies of the outer zones $O^1$ and $O^2$, each of which may be composed of two layers as indicated in the drawings, are made of nylon cords. A further principles which we prefer to embody in the cord structure of each of the zones is based upon the fact that the fatigue rate of cords with high twist is greater than the fatigue rate of cords with lower twist when flexed under a stress reversal in tension and also from tension to compression. The three inside plies of zone I are, therefore, composed of low twist rayon cord while the plies in each of the outside zones $O^1$ and $O^2$ are composed of high twist nylon cords. As examples of the same the rayon cords may have a relatively low twist of the order of seven to twelve turns per inch, while the nylon cords may have a relatively high twist of the order of nine to fourteen turns per inch, the different degrees of twist being indicated diagrammatically in Fig. 3 of the drawings.

As equivalents for the rayon cords, I may use cotton, "Dacron" (a polyester resin) or other low stretch cords. As an equivalent for the nylon cords, I have found that "Dacron" cords heat treated to yield a high stretch modulus are serviceable.

When a belt with a strength member construction of this character is flexed under tension over a pulley, the outside plies of nylon, due to their high stretch characteristic, will carry less tension than would be carried if the outside plies were composed of the same rayon cords as used in the three center or inside plies. The three inner rayon plies will carry the greater portion of the total tension of the belt and because of their low elongation characteristics they will hold the whole belt stretch to a minimum, thus preventing excessive elongation of the belt in operation. In addition to this, the plies of the outer zones $O^1$ and $O^2$, when they are in the position of constituting the bottom plies of the belt, because of their high twist characteristics, will fatigue much less in compression than would two plies made of this same rayon material as used in the three inside plies.

The results and advantages during flexing and in flexing reversals that are attained by means of this construction are those that have been heretofore set forth, which may be further illustrated by the following chart showing the tensions on each ply of belt strength members as the belt is flexed over the drive pulleys, comparison being made between a belt B embodying a construction of the present invention, and a belt X in which latter the plies are composed of all rayon layers:

*Tension on each ply of belt as it is flexed over a 42 inch diameter pulley*

BELT B

| Pulley | Head | Snub | Tail |
|---|---|---|---|
| Nylon Plies—Zone $O^1$: | | | |
| Top ply | 124.2 | 67.2 | 45.8 |
| 2nd ply | 115.9 | 58.9 | 37.5 |
| Rayon Plies—Zone I: | | | |
| 3rd ply | 229.2 | 107.5 | 62.2 |
| 4th ply | 199.2 | 77.5 | 32.2 |
| 5th ply | 169.2 | 47.5 | 2.2 |
| Nylon Plies—Zone $O^2$: | | | |
| 6th ply | 65.3 | 8.3 | 1.0 |
| 7th ply | 57. | 0 | 0 |
| Total | 960.0 | 366.9 | 180.9 |

BELT X

| Pulley | Head | Snub | Tail |
|---|---|---|---|
| Rayon Plies—Zone $O^1$: | | | |
| Top ply | 228 | 133.4 | 90.6 |
| 2nd ply | 197 | 103.4 | 60.3 |
| Rayon Plies—Zone I: | | | |
| 3rd ply | 167 | 73.4 | 30. |
| 4th ply | 137 | 43.4 | 0 |
| 5th ply | 107 | 13.3 | 0 |
| Rayon Plies—Zone $O^2$: | | | |
| 6th ply | 77 | 0 | 0 |
| 7th ply | 47 | 0 | 0 |
| Total | 960 | 366.9 | 180.9 |

The following comparison of the operational characteristics of belt B and belt X may be made.

In belt B the rayon plies of the zone I will sustain the greater part of the load or tension of the belt (as distinguished from the rayon plies of the corresponding zone I of the belt X). It will be observed that for the plies of this zone the alternating changes from high tension and low tension in flexing reversals are not materially different in the belts B and X; however, it will be noted that while in the belt X two of the layers are under an undesired compression stress at the tail pulley, the corresponding plies in the belt B do not suffer a compression stress at the tail pulley.

In the plies of the outer zones it will be observed that the highest tension of the top ply of the all-rayon belt is 228 pounds and the lowest tension of the bottom ply is 47 pounds, producing a differential of 181 pounds, while the top ply of the belt B has a tension of about 124 pounds and the bottom ply of said belt has a tension of 57 pounds, with a resulting differential of only 67 pounds. Thus, the change from high tension to low tension for the belt B during a flexing reversal is very substantially less than that for belt X, the alternating extremes of tensions during flexing or belt reversals for the outer plies being thus greatly reduced in amount.

It will further be observed that at the lowest tension (at the tail pulley) there are four bottom plies in compression for belt X, while for belt B only one ply is in compression. And, since the top and bottom plies of the belt B are composed of relatively high twist nylon cord these plies are ideally constructed to take up this compression.

The belt structure of belt B, therefore, carries out the principles of belt construction above detailedly described.

Conveyor belt B when it flexes over a pulley actually divides its strength members into three zones, one extension zone (the zone $O^1$ or $O^2$ as the case may be), one intermediate zone where flexing is minimized and a maximum load will be carried, and third, one compression zone. The tensions are thus divided between three zones in relation and in a manner to materially reduce the fatigue rate of the belt plies in operation and to produce a conveyor belt of longer life. The belt thus provided will also operate more efficiently in use, contact between the belt surface and the pulley surface being permitted more effectively, this further enabling also the preferred use of pulleys of smaller diameter. Moreover, the strength members (which are the members that protect the belt against damage due to gouging, tearing and punctures) are arranged in an inner and thus in a sealed and protected zone.

While I have shown the principles of the invention applied preferably to a conveyor belt, and while I have selected the preferred materials for accomplishing the different required stretch characteristics of the belt strength members, it will be apparent that changes may be made therein without departing from the spirit of the invention defined in the following claims.

I claim:

1. A laminated belt comprising a series of superimposed plies of fabric belt strength members bound together and rubber covered, the plies of said belt strength members being arranged in three zones, namely, an inside zone and two outer zones, the fabric belt strength members of the inside zone comprising cords characterized by the property of relatively low stretchability, and the fabric belt strength members of each of the two outer zones comprising cords characterized by the property of relatively high stretchability.

2. A laminated belt comprising a series of superimposed plies of fabric belt strength members bound together and rubber covered, the plies of said belt strength members being arranged in three zones, namely, an inside zone and two outer zones, the fabric belt strength members of the inside zone comprising a plurality of layers of cords characterized by the property of low stretchability, and the fabric belt strength members of each of the two outer zones comprising a plurality of layers of cords characterized by the property of relatively high stretchability and of compressibility.

3. The laminated belt of claim 1 in which the cords of each of its two outer zones are nylon cords and the cords of the inside zone are rayon cords.

4. The laminated belt of claim 1 in which the cords of each of the two outer zones are nylon cords of a relatively high twist of the order of 9 to 14 turns per inch and the cords of the inside zone are rayon cords of relatively low twist of the order of 7 to 12 turns per inch.

5. The laminated belt of claim 2 in which the cords of the plurality of layers in each of the outer zones are nylon cords and the cords of the plurality of layers of the inside zone are rayon cords.

6. A laminated belt comprising a body of superimposed plies of fabric belt strength members bound together, a protective fabric enveloping said body and an outer vulcanized rubber cover therefor, the plies of said belt strength members being arranged in three zones, namely, an inside zone and two outer zones on opposite sides of the inside zone, the fabric belt strength members of the inside zone comprising cords characterized by the property of relatively low stretchability, and the fabric belt strength members of each of the two outer zones comprising cords characterized by the property of relatively high stretchability, the inside zone thereby functioning as the high tension zone and the outer zones thereby functioning as the low tension zones.

7. The laminated belt of claim 6 in which the cords of each of the two outer zones are nylon cords and the cords of the inside zone are rayon cords.

8. The laminated belt of claim 6 in which the cords of each of the two outer zones are nylon cords of a relatively high twist of the order of 9 to 14 turns per inch and the cords of the inside zone are rayon cords of relatively low twist of the order of 7 to 12 turns per inch.

9. A laminated belt comprising a body of superimposed plies of fabric belt strength members bound together, a protective fabric enveloping said body and an outer vulcanized rubber cover therefor, the plies of said belt strength members being arranged in three zones, namely, an inside zone and two outer zones on opposite sides of the inside zone, the fabric belt strength members of the inside zone comprising cords characterized by the property of relatively low stretchability, and the fabric belt strength members of each of the two outer zones comprising cords characterized by the property of relatively high stretchability and of compressibility, the inside zone thereby functioning as the high tension zone and the outer zones thereby functioning as the low tension zones and as compression zones.

10. The laminated belt of claim 9 in which the cords of each of the two outer zones are nylon cords and the cords of the inside zone are rayon cords.

References Cited in the file of this patent

UNITED STATES PATENTS

| | | |
|---|---|---|
| 2,281,148 | Freedlander | Apr. 28, 1942 |
| 2,377,650 | Reimel | June 5, 1945 |
| 2,630,603 | Freedlander et al. | Mar. 10, 1953 |
| 2,698,032 | Bacon | Dec. 28, 1954 |